United States Patent Office 3,066,161
Patented Nov. 27, 1962

3,066,161
PREPARATION OF BASIC LEAD STYPHNATE
Julius M. Komarmy, Fayetteville, Ark., and Wilson J. Broach, Natchitoches, La., assignors, by mesne assignments, to the United States of America as represented by the Secretary of the Navy
No Drawing. Filed May 27, 1955, Ser. No. 511,808
3 Claims. (Cl. 260—435)

This invention relates to a process for the preparation of basic lead styphnate. The importance of basic lead styphnate in the explosives industry emphasizes the importance of a process for its production in pure form for experimental purposes. Further, a process for the preparation of basic lead styphnate which is adaptable to the preparation of conducting mixes for use as ingredients in electrical initiators is highly desirable.

Former methods for the production of basic lead styphnate required the use of water as a solvent for the reactants. This procedure has the disadvantage that relatively large amounts of solvent per amount of product are required, thus adding to the expense and complexity of the process. Further, the product formed by former methods required ball milling to reduce it to the finely divided state, and the prior methods also required the use of a crystallization agent to induce precipitation.

It is an object of this invention to provide a process for the preparation of basic lead styphnate which eliminates the use of water as a solvent for the reactants.

It is another object of this invention to provide a method for the production of basic lead styphnate which produces a product in the finely divided state and which does not require the use of a crystallization agent to induce precipitation.

It has been found that the above and other objects are accomplished by dissolving a slight excess of styphnic acid and lead nitrate in glycerol and adjusting the pH of the solution to a value between 3.8 and 5.0 until a precipitate of lead styphnate is formed.

The process of the invention is illustrated by the following example: A solution of styphnic acid in glycerol was made wtih styphnic acid in slight excess and lead nitrate added. Enough water was added to ensure the solution of lead nitrate. A dilute solution of sodium hydroxide was added to the solution of the reactants with constant stirring. The precipitate which formed between a pH of 3.8 and 5.0 was filtered off and washed several times with water followed by washing with acetone. The product was then dried by the usual methods. The crystals formed were in a very finely divided state so that ball milling was not necessary. The identity of the compound was verified by lead and carbon analysis and by X-ray diffraction pattern. In the process, ammonium or potassium hydroxide may be substituted for sodium hydroxide and lead acetate may be used instead of lead nitrate as the lead salt.

An advantage of the invention is the fact that because the reactants are much more soluble in glycerol than in water, a comparatively smaller amount of solvent is necessary as compared to prior processes. Further, the process obviates the use of a crystallizing agent to induce precipitation.

The order in which the steps of the process are formed is important in producing a satisfactory product.

Obviously, many modifications and variations of the present invention are possible in the light of the above teachings. It is therefore to be understood that within the scope of the appended claims the invention may be practiced otherwise than as specifically described.

What is claimed is:

1. The process of preparing basic lead styphnate which comprises dissolving styphnic acid and a lead salt from the class consisting of lead acetate and lead nitrate in glycerol, and adjusting the pH value of the solution from the class consisting of ammonium hydroxide, sodium hydroxide and potassium hydroxide.

2. The process of preparing basic lead styphnate which comprises dissolving a slight excess of styphnic acid and lead nitrate in glycerol and then adding sodium hydroxide to the solution until it pH value is between about 3.8 and about 5.0.

3. The process of preparing basic lead styphnate which comprises dissolving styphnic acid and a salt from the class consisting of lead nitrate and lead acetate in glycerol, and adjusting the pH value of the solution to between 3.8 and about 5.0 by the addition of a strongly alkaline hydroxide.

References Cited in the file of this patent

UNITED STATES PATENTS

| | | |
|---|---|---|
| 1,942,274 | Brun | Jan. 2, 1934 |
| 2,020,665 | Tauson | Nov. 12, 1935 |